Figure 1:
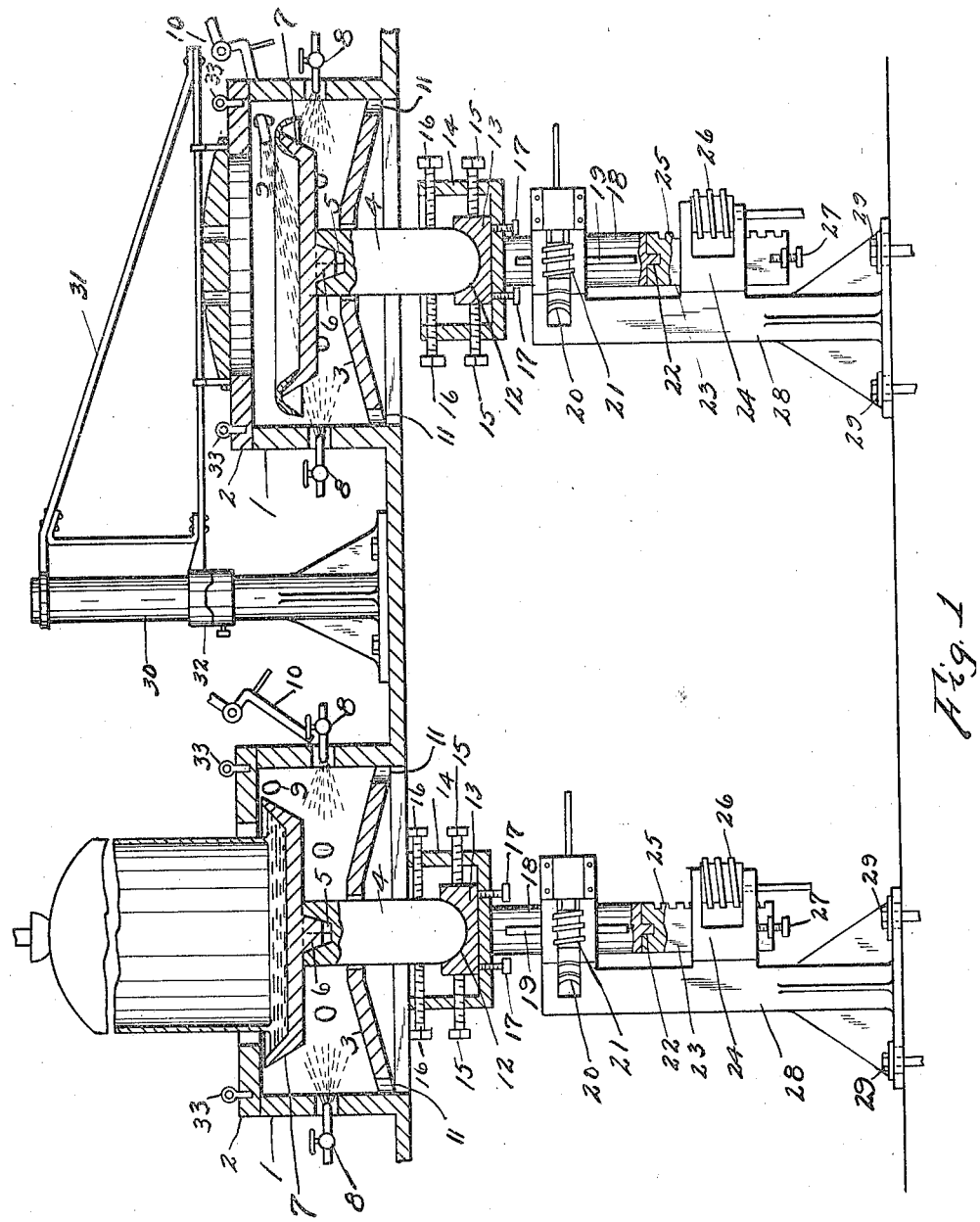

A. E. SPINASSE.
METHOD OF CLEANING POTS.
APPLICATION FILED JULY 9, 1913.

1,157,597.

Patented Oct. 19, 1915.

Witnesses
W. E. S. Bock
Ruth Livingston

Inventor
Arthur E. Spinasse
By Edwin P. Corbett
Attorney

UNITED STATES PATENT OFFICE.

ARTHUR E. SPINASSE, OF MOUNT VERNON, OHIO.

METHOD OF CLEANING POTS.

1,157,597.  Specification of Letters Patent.  Patented Oct. 19, 1915.

Application filed July 9, 1913. Serial No. 778,029.

*To all whom it may concern:*

Be it known that I, ARTHUR E. SPINASSE, a citizen of the United States of America, residing at Mount Vernon, in the county of Knox and State of Ohio, have invented certain new and useful Improvements in Methods of Cleaning Pots, of which the following is a specification.

My invention relates to the art of drawing glass from pots and consists in a novel method of cleaning pots, it being customary to clean the pot after every drawing operation.

Hitherto, in every case with which I am acquainted, the cleaning of the pot has been effected by gravity, that is, by inverting or partially inverting the pot so that the glass will pass therefrom with a natural gravity action. Generally, this passing of the glass from the pot has been rendered more free by the heating of the glass or pot until the glass becomes fluid-like.

By my invention, the inertia of the glass is made to effect its removal from the pot. "Inertia is the persistence of matter in whatever state of rest or of motion it may chance to be, and its resistance to any attempt to change that state." In the one form of my method, I move the pot, containing the glass to be removed, in one direction and then change the direction of movement of such pot, whereby the glass, continuing in the original direction of motion, flies off the pot.

Preferably, the inertia of the glass is rendered effective by whirling the pot so that the fluid-like glass passes off by centrifugal force. The cleaning is more readily effective, if the pot is maintained in a zone of heat whereby the glass next the wall and bottom becomes more fluid and assumes a lubricating quality over which the remaining glass readily slides and it is sometimes desirable to, simultaneously with the whirling of the pot, direct a heating current into the interior thereof.

A preferred apparatus for carrying my method into effect is illustrated in the accompanying drawings in which similar characters of reference designate corresponding parts throughout the view, and in which—

The figure is a vertical section of a compound pot-furnace wherein the left-hand pot-furnace shows in the operation of drawing and the right-hand pot-furnace shows in the operation of cleaning.

Inasmuch as the pot-furnaces are identical in construction, only one will be described and the reference characters applied to the parts wherever they appear.

The pot-furnace comprises a casing 1 having a top stone 2 and having a frusto-conical floor 3 through which there extends a vertical shaft 4 having a socket 5 in its upper end of squared form for the reception of a similarly squared stud 6 on the base of a pot 7 to be removably mounted on said shaft. The pot and shaft are preferably both of refractory material and the shaft is mounted very loosely in the opening in the floor 3. The casing 1 is desirably provided with apertures for burners 8 and with a supplemental aperture 9 for a removable pipe 10 which may be utilized to direct a hot flame or other melting current into the interior of the pot while it is being whirled, as illustrated in the right-hand pot-furnace of the figure. The floor of the casing is provided with drainage ports 11 which may empty into any suitable receptacle.

The base of the vertical shaft 4 is rounded as at 12 and supported in a similarly rounded socket of a slidable block 13 mounted in a casing 14 and laterally adjustable by means of set screws 15 which coact with set screws 16 bearing upon the shaft 4 to center the pot and also to level it. Slight vertical adjustments of the pot are readily effected by the manipulation of set screws 17 extending through the base of the casing 14.

Rigidly connected to the base of the casing 14, is a shaft 18 having a spline rib 19 effecting a slidable locking connection with a worm gear 20 which is adapted to be rotated, to rotate the pot in either direction, by a worm 21 driven in any manner. This shaft 18 terminates shortly below the spline rib in a reduced cylindrical portion 22 which is adapted to rotate in a cylindrical socket of a squared supporting post 23 passing through a bracket 24 and having a rack 25 for coaction with a worm 26. This worm and rack formation is utilized so that the post and consequently the pot may be raised or lowered as desired. A gage screw limits the upward movement of the pot, this screw being designated 27. The standard 28 is laterally adjustable by means of its bolt and slot support 29 at its base.

Mounted between the pot-furnaces is a vertical standard 30 about which swings a lid-carrying element 31, this element being automatically lifted in the course of its swinging by means of a cam structure 32. This element may be utilized, as well, for the handling of a top stone, as for instance by the eye-members 33 and other connecting means not shown. It will be seen by reference to the drawings that the lid covers the pot-furnaces alternately.

In the operation of the structure shown, it will be seen that the pot is elevated and about this time is filled or partially filled with molten glass, whereupon the drawing operation is proceeded with. When the drawing operation is completed and the cylinder severed, the pot is lowered into the zone of heat, the casing closed by the lid and the pipe 10 placed in such position that it directs a flame into the interior of the pot. The pot is then rotated until the speed thereof is such that the glass passes over the edges of the pot by centrifugal force.

Having thus described my invention, what I claim is:

1. The method of removing unused fused or plastic glass from a circular pot, which consists in rotating said pot about its vertical center at a speed sufficient to cause such glass by its inertia to overcome adhesions to the sides of the pot and its own stringy or viscous nature and thereby remove itself from the said pot.

2. The method of removing unused and stiffening glass from a glass drawing pot, which consists in mounting said pot for circular motion in a horizontal plane and subjecting said pot to such movement in such plane at a speed sufficient to cause the glass to pile up against the wall of the pot and to overflow said wall, thereby cleansing said pot.

3. The method of removing unused and stiffening glass from a glass drawing pot, which consists in mounting said pot for circular motion in a horizontal plane and subjecting said pot to such movement in such plane at a speed sufficient to cause the glass to pile up against the wall of the pot and to overflow said wall, thereby cleansing said pot, the said rotation being effected while the pot is kept hot.

4. The method of removing unused and stiffening glass from a glass drawing pot, which consists in mounting said pot for circular motion in a horizontal plane and subjecting said pot to such motion in such plane at a speed sufficient to cause the glass to pile up against the wall of the pot and to overflow said wall, thereby cleansing said pot, the said rotation being effected while the pot is exteriorly heated, to free the glass more readily from the sides of the pot.

5. The method of cleaning glass from a pot which comprises directing a melting current into said pot and another current against the outside thereof and so moving said pot that the glass flies off by its own inertia.

In testimony whereof I, hereby, affix my signature in presence of two witnesses.

ARTHUR E. SPINASSE.

Witnesses:
C. E. O'NEILL,
WALTER E. L. BOCK.

Copies of this patent may be obtained for five cents each, by addressing the "Commissioner of Patents, Washington, D. C."